(12) United States Patent
Chow et al.

(10) Patent No.: US 9,229,580 B2
(45) Date of Patent: Jan. 5, 2016

(54) SYSTEM AND METHOD FOR DETECTING OBJECT IN THREE-DIMENSIONAL SPACE USING INFRARED SENSORS

(71) Applicant: TECHNOKEY COMPANY LIMITED, Hong Kong (HK)

(72) Inventors: King Sang Chow, Hong Kong (HK); Zhonghui Zhao, Hong Kong (HK); Ka Fung Yeung, Hong Kong (HK)

(73) Assignee: TECHNOKEY COMPANY LIMITED, Hong Kong (HK)

( * ) Notice: Subject to any disclaimer, the term of this patent is extended or adjusted under 35 U.S.C. 154(b) by 136 days.

(21) Appl. No.: 14/131,463

(22) PCT Filed: Jun. 18, 2013

(86) PCT No.: PCT/CN2013/077389
§ 371 (c)(1),
(2) Date: Jan. 8, 2014

(87) PCT Pub. No.: WO2014/019418
PCT Pub. Date: Feb. 6, 2014

(65) Prior Publication Data
US 2015/0185894 A1 Jul. 2, 2015

Related U.S. Application Data

(60) Provisional application No. 61/679,074, filed on Aug. 3, 2012.

(51) Int. Cl.
| G06F 3/042 | (2006.01) |
| G01S 17/00 | (2006.01) |
| G01S 17/42 | (2006.01) |
| G01S 17/87 | (2006.01) |
| G06F 3/01 | (2006.01) |
| G06F 3/0346 | (2013.01) |

(52) U.S. Cl.
CPC ............... *G06F 3/042* (2013.01); *G01S 17/003* (2013.01); *G01S 17/42* (2013.01); *G01S 17/87* (2013.01); *G06F 3/011* (2013.01); *G06F 3/017* (2013.01); *G06F 3/0346* (2013.01)

(58) Field of Classification Search
CPC combination set(s) only.
See application file for complete search history.

(56) References Cited

U.S. PATENT DOCUMENTS

2004/0217267 A1* 11/2004 Reime ........................ 250/221
2012/0194477 A1* 8/2012 Krah ............................ 345/175

FOREIGN PATENT DOCUMENTS

CN 1541451 A 10/2004

OTHER PUBLICATIONS

International Search Report of PCT Application No. PCT/CN2013/077389.

* cited by examiner

*Primary Examiner* — Robin Mishler

(57) ABSTRACT

A system for detecting an object in three-dimensional space includes: four emitters defining a rectangular detection area, the emitters being disposed around the four vertices of the rectangular detection area respectively; two receivers being disposed at the midpoints of two edges of the rectangular detection area respectively; and an electronic controller being connected with the emitters and the receivers and configured to control the emitters to radiate light in predetermined wavelengths, to control the receivers to capture light in the predetermined wavelengths reflected by the object and thereby output a plurality of signals, and to convert the signals into coordinates of the object.

15 Claims, 8 Drawing Sheets

SYSTEM AND METHOD FOR DETECTING OBJECT IN THREE-DIMENSIONAL SPACE USING INFRARED SENSORS

FIELD OF THE PATENT APPLICATION

The present patent application generally relates to human-machine interaction technologies and more specifically to a system and a method for detecting an object in three-dimensional space using infrared sensors.

BACKGROUND

To realize human-machine interaction, a number of technologies have been applied. Among them, one is floating touch, which is used in systems such as Samsung Galaxy S4. Floating touch combines the self and mutual capacitance touch sensing to detect a fingertip; however, it only has a dynamic range up to 5 cm. Another is camera hand recognition, which is used in systems such as Xbox Kinect. Camera hand recognition continuously captures images and compares hand positions of a user in different pictures so as to determine the hand motion. It requires the user to be at some minimum distance (about 60 cm) away from the system.

SUMMARY

The present patent application is directed to a system for detecting an object in three-dimensional space. In one aspect, the system includes: four emitters defining a rectangular detection area, the emitters being disposed around the four vertices of the rectangular detection area respectively; two receivers being disposed at the midpoints of two edges of the rectangular detection area respectively; and an electronic controller being connected with the emitters and the receivers and configured to control the emitters to radiate light in predetermined wavelengths, to control the receivers to capture light in the predetermined wavelengths reflected by the object and thereby output a plurality of signals, and to convert the signals into coordinates of the object.

DETAILED DESCRIPTION

Figure 1:
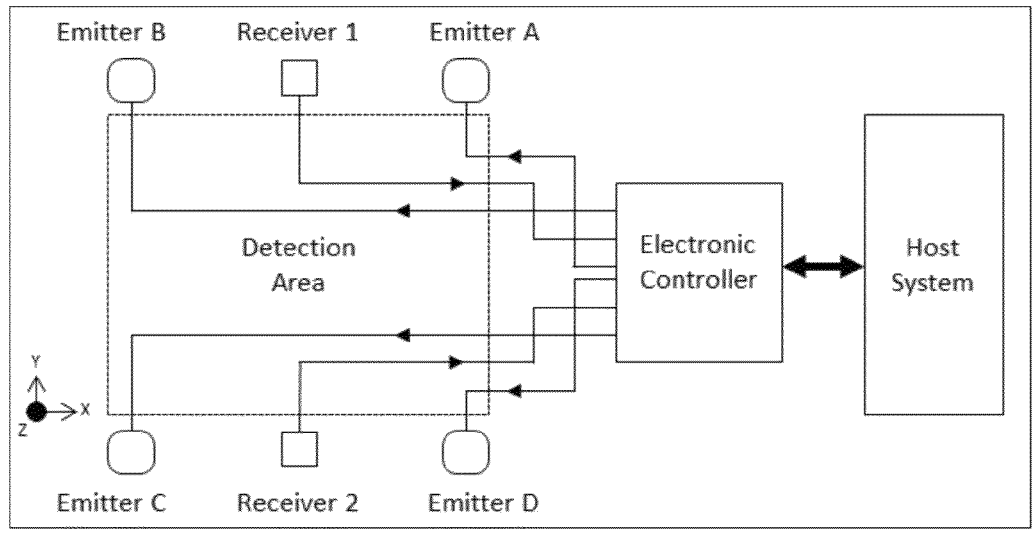
FIG. 1 illustrates a system for detecting an object in three-dimensional space using infrared sensors in accordance with an embodiment of the present patent application.

FIG. 1 illustrates a system for detecting an object in three-dimensional space using infrared sensors in accordance with an embodiment of the present patent application. Referring to FIG. 1, the set-up of infrared sensors that can be used to detect the Cartesian coordinates (X, Y, Z) of an object moving in the three-dimensional (3D) space is illustrated. Four emitters (Emitters A, B, C and D) and two receivers (Receivers 1 and 2) are placed in locations such that they define a rectangular detection area. The emitters, when driven by electrical current, are configured to emit electromagnetic radiation in the near-infrared (NIR) wavelengths. The receivers are sensitive to electromagnetic radiation in wavelengths matching with the emitters, and would convert the received photons into electrons. The emitters and receivers are controlled by an electronic controller. This electronic controller controls when and how the emitters should radiate, and convert the received signals from the receivers into the Cartesian coordinates of the object it is detecting. The electronic controller is configured to transmit the object's coordinates to, and also communicate with, a host system digitally.

In this embodiment, the system for detecting an object in three-dimensional space includes: four emitters defining a rectangular detection area, the emitters being disposed around the four vertices of the rectangular detection area respectively; two receivers being disposed at two edges of the rectangular detection area respectively; and an electronic controller being connected with the emitters and the receivers and configured to control the emitters to radiate light in predetermined wavelengths, to control the receivers to receive light in the predetermined wavelengths reflected by the object and thereby output a plurality of signals, and to convert the signals into coordinates of the object.

The emitters may take the form of light-emitting-diodes (LEDs). The receivers may take the form of photodiodes. The electronic controller may include some or all of the following devices: DC power supplies, amplifiers, filters, comparators, analog-to-digital convertors (ADCs), digital logic circuits, random access memory (RAM), non-volatile memory, oscillators, current drivers, and interfacing circuits. The electronic controller may take the forms of integrated circuits (ICs), printed-circuit-board-assemblies (PCBAs), and/or hybrid-circuits. The host system may be any electronics products that have a display device, such as digital computers, mobile phones, music players, video players, digital photo frames, navigators, and industrial/medical/laboratory instruments and equipment.

Figure 2:
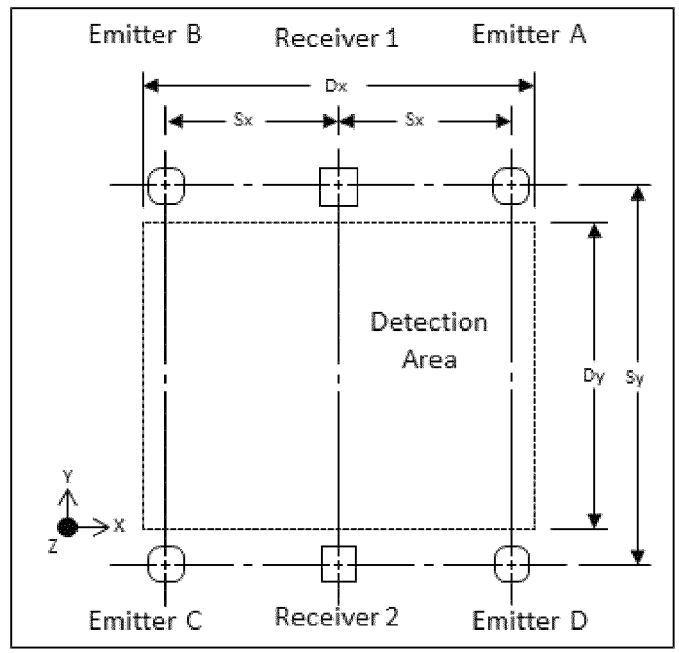
FIG. 2 shows how emitters and receivers should be placed in relation to a detection area in the system depicted in FIG. 1.

Referring to FIG. 2, the width of the detection area is denoted by Dx. The length of the detection area is denoted Dy. The center points of Emitter A, Receiver 1, and Emitter B should all align with each other. The center points of Emitter C, Receiver 2, and Emitter D should all align with each other. The distance between the center points of Emitter A and Receiver 1 is denoted Sx. The distances between the center points of Emitter B and Receiver 1, Emitter C and Receiver 2, Emitter D and Receiver 2 should all be Sx as well. The distance between the center points of Receiver 1 and Receiver 2 is denoted Sy. The emitters and receivers should be placed so that 2 times Sx is smaller than or equal to Dx, and Sy is greater than or equal to Dy. In other words, each edge of the rectangular detection area that has a receiver disposed thereon is longer than the distance between the centers of emitters disposed at the two ends of the edge, while each edge of the rectangular detection area that has no receiver disposed thereon is shorter than the distance between the centers of emitters disposed at the two ends of the edge. FIGS. 3A-3D show the isotropic views of the IR sensors in action. The electronic controller, which is not shown for simplicity, only activates one emitter at a time. When an emitter is activated, it emits IR radiation (i.e. radiates light). This incidental radiation is denoted 1x and is represented by the solid red line. If an object of interest is inside the detection area, it reflects the IR radiation to a receiver. This reflected radiation is denoted Rx and is represented by the dotted red line. The subscript x denotes which emitter the IR radiation is originated from.

Figure 3A:
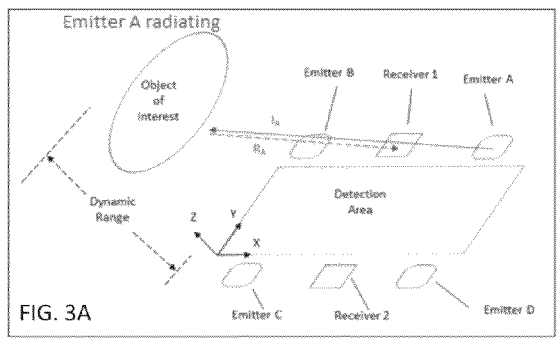
FIG. 3A shows that Emitter A is activated by the electronic controller to radiate light and the light is reflected by an object to Receiver 1.
Figure 3B:
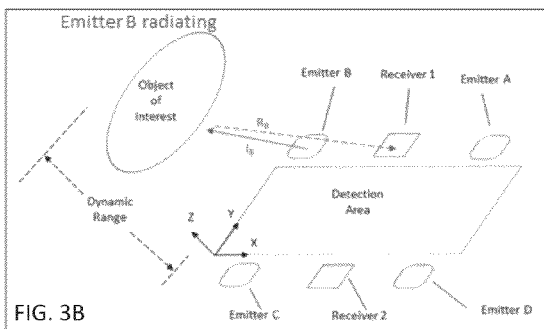
FIG. 3B shows that the reflected radiation originated from Emitter B is detected by Receiver 1.
Figure 3C:
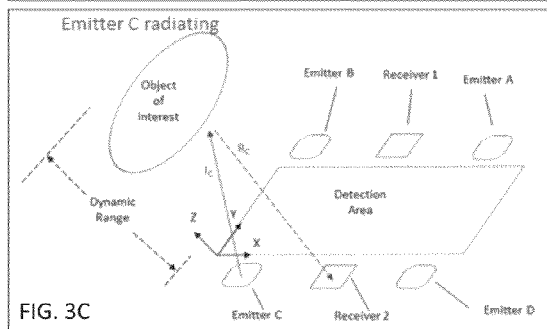
FIG. 3C shows that the reflected radiation originated from Emitter C is detected by Receiver 2.
Figure 3D:
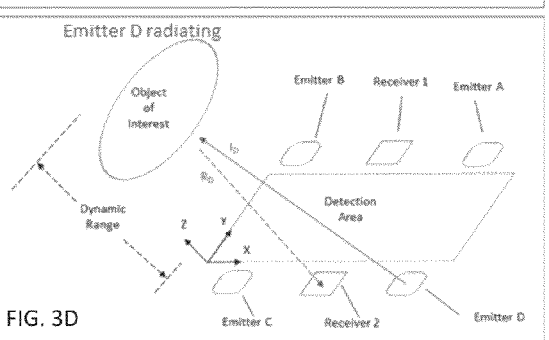
FIG. 3D shows that the reflected radiation originated from Emitter D is detected by Receiver 2.
Figures 4A, 4B, 4C, 4D:
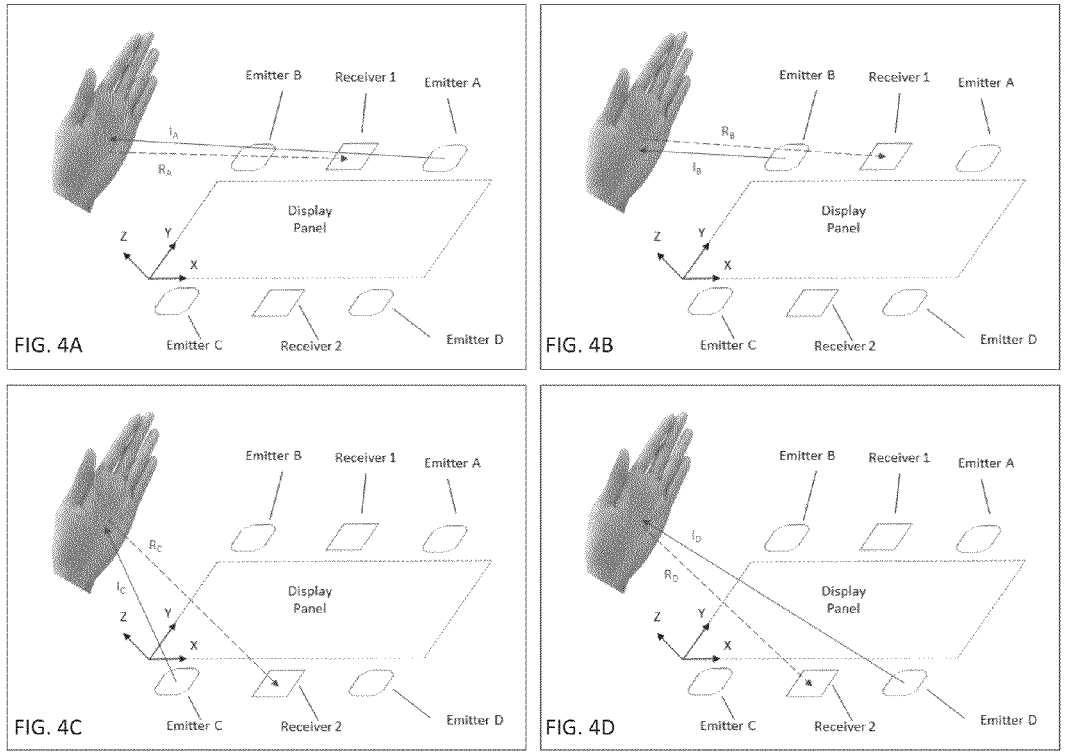
FIG. 4A shows that Emitter A is activated by the electronic controller to radiate light and the light is reflected by a user's hand to Receiver 1.
FIG. 4B shows that the radiation originated from Emitter B is reflected by a user's hand and detected by Receiver 1.
FIG. 4C shows that the radiation originated from Emitter C is reflected by a user's hand and detected by Receiver 2.
FIG. 4D shows that the radiation originated from Emitter D is reflected by a user's hand and detected by Receiver 2.

FIG. 3A shows that Emitter A is activated by the electronic controller and radiating light ($I_A$). The reflected radiation ($R_A$) is detected by Receiver 1. FIG. 3B shows that the reflected radiation originated from Emitter B ($R_B$) is also detected by Receiver 1. FIG. 3C shows that the reflected radiation originated from Emitter C ($R_C$) is detected by Receiver 2. FIG. 3D shows that the reflected radiation originated from Emitter D ($R_D$) is also detected by Receiver 2. By activating one emitter at a time, the electronic controller can distinguish which emitter the received signal is originated from. This feature ensures that the emitter radiation does not interfere with each other, and the actual sequence of emission does not matter.

If the object is so close to the sensors that it cannot reflect enough IR to the receivers, or if it is so far away from the sensors that not enough incidental radiation can illuminate it, then detection is not possible. These characteristics define the dynamic range in the Z-direction of the system.

It is noted that no devices, such as the emitters, the receivers, or any other electronics, are needed to be installed or placed on the object of interest. The system can detect the object as long as it has a surface area that reflects the incidental IR radiation ($I_x$) that is illuminated on it. This powerful feature allows the system to detect the position of an unaided human hand. FIGS. 4A-4D are adapted from FIGS. 3A-3D respectively. FIGS. 4A-4D illustrate the case when the system is used to detect the 3D positions of a user's hand. The detection area is set equivalent to the size of the display device, such as an electronic display device or a monitor, of the host system.

Figure 5:
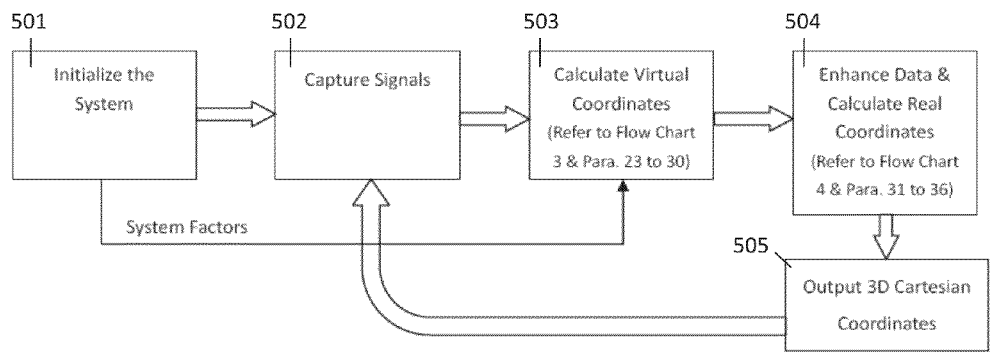
FIG. 5 shows an overall flow of a method that the system depicted in FIG. 1 is configured to implement.

FIG. 5 shows an overall flow of a method that the system depicted in FIG. 1 is configured to implement. Referring to FIG. 5, at the beginning, the electronic controller initializes a set of system factors that will be used for subsequent calculations (step 501). Next at step 502, the reflected IR signals from the user's hand ($R_A$, $R_B$, $R_C$, $R_D$) are captured by the receivers and converted into digital signals by the electronic controller. Once the signals are digitized, at step 503, the electronic controller performs some calculations to determine the virtual coordinates of the user's hand in 3D space. Based on the resultant Z coordinate value, at step 504, the electronic controller is configured to further process the X and Y virtual coordinate values so that they correspond to the pixel points on the host system's display device and become the real X and Y coordinates. Finally in step 505, the electronic controller outputs the final X, Y, and Z coordinate values to the host system. After this step, the system loops back to the step 502 to start the cycle again. If the host system is a digital computer, it may use the X and Y coordinate values to control the cursor so that its movement will coincide with the movement of the user's hand.

Four sets of systems factors are used in the method to calculate the final 3D Cartesian coordinates. The first set is the orientation information of the host system's display device. The method determines the final X and Y coordinate values in relation to the left, right, upper, and lower edges of the display. So it is imperative to know how the display is oriented. If the landscape orientation shown in FIG. 2 is considered normal, then Emitter A is thought to be located on the upper-right, Emitter B on upper-left, Emitter C on lower-left, and Emitter D on the lower-right edge of the display. Changes in the X coordinate values are interpreted as movement in the horizontal direction. Changes in the Y coordinate values are interpreted as movement in the vertical direction.

As an example, if the display is rotated by 90 degrees clockwise to a portrait orientation, Emitter B is thought to be located on the upper-right, Emitter C on upper-left, Emitter D on lower-left, and Emitter A on the lower-right edge of the display. Changes in the X coordinate values are interpreted as vertical movement. Changes in the Y coordinate values are interpreted as horizontal movement. So the display orientation has critical effect on the outcomes of the method. The electronic controller must take this into account in subsequent calculations. This orientation information should be provided by the host systems to the electronic controller.

If a host system remains stationary throughout its operation, such as a desktop computer, or does not provide the orientation information, it is considered to be in the normal position. Nowadays many mobile electronic devices, such as digital camera and mobile phone, contain accelerometers to determine their orientation. When the method is adapted into these devices, the orientation information is readily available.

The second set of system factors are used to set the overall boundaries of the (rectangular) detection area, in X, Y, and Z directions. These overall boundaries are important in the method to scale and present the obtained coordinate values to the host system. When the method is applied to use the hand to control the movement of a cursor on a display device, the detection area in the X and Y direction are set to equal the resolution of the display device, in terms of number of pixels. On the other hand, at present there are no physical limitations to restrict how the Z coordinate values are presented, thus any suitable scales may be adapted. For most applications in digital electronics, using percentage or power of two as a scale to set the Z overall boundaries suffices. The overall boundary in the X direction is denoted as BX and set to equal to the display device's horizontal resolution. The overall boundary in the Y direction is denoted as BY and set to equal to the display panel's vertical resolution. The overall boundary in the Z direction is denoted as BZ.

To improve performance, the X and Y boundaries are scaled up throughout the calculations. The actual reasons are discussed in more detail hereafter. For the moment the third set of system factors are defined to be FX1, FY1, FX2, and FY2, which are called the scaling factors (for scaling up X and Y boundaries of the rectangular detection area). The fourth set of system factors are defined as VBX1, VBY1, VBX2, and VBY2, which are called the virtual boundaries (of the rectangular detection area). The scaling factors and virtual boundaries are mathematically related to the overall boundaries as such:

$$VBX1=(BX)(FX1) \qquad [Eq. 1]$$

$$VBY1=(BY)(FY1) \qquad [Eq. 2]$$

$$VBX2=(BX)(FX2) \qquad [Eq. 3]$$

$$VBY2=(BY)(FY2) \qquad [Eq. 4]$$

Figure 6:
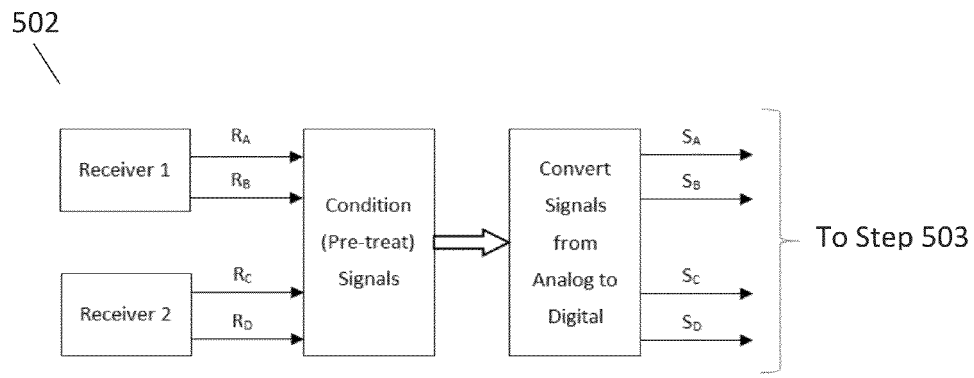
FIG. 6 shows detailed operations in the signal capture stage (step 502).

FIG. 6 shows detailed operations in the signal capture stage (step 502). When captured by the receivers, signals $R_A$, $R_B$, $R_C$, and $R_D$ output by the receivers are in an analog format. They are sent to the electronics controller for further processing. At first they are filtered and amplified to meet the conditions for the subsequent analog-to-digital converter (ADC). This stage is called the Conditioning or Pre-treating stage. Next the signals are converted by the ADC to digital formats. The digitized signals are outputted as $S_A$, $S_B$, $S_C$, and $S_D$.

Figure 7:
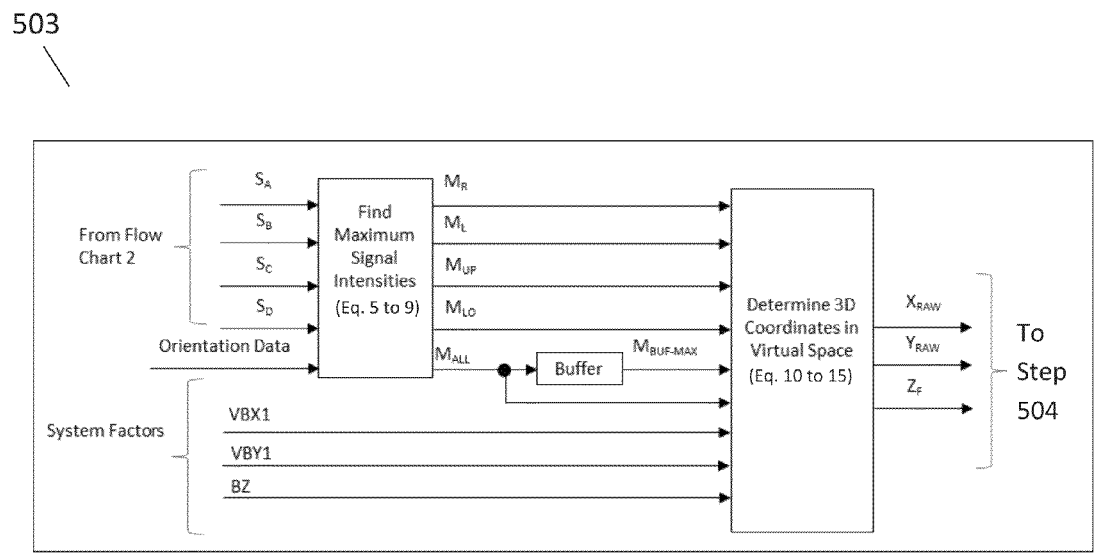
FIG. 7 shows the operations by which the virtual coordinates of the object are calculated (step 503).

FIG. 7 shows the operations by which the virtual coordinates of the object are calculated (step 503). To improve results, the method temporarily enlarges the detection area in the XY plane. The detailed reasons and operations will be described in more detail hereafter. As illustrated in FIG. 7, in the first stage, the digitized signals are compared among themselves to find the maximum values of the received signals at the right, left, upper, lower sides (edges) of the rectangular detection area, and the overall highest signal value. Mathematically, the relations are:

$$M_{ALL}=\text{Maximum of }(S_A,S_B,S_C,S_D) \qquad [Eq. 5]$$

If Host System's Orientation=0°

$$M_R=\text{Maximum of }(S_A,S_D)$$

$$M_L=\text{Maximum of }(S_B,S_C)$$

$$M_{UP}=\text{Maximum of }(S_A,S_B)$$

$$M_{LO}=\text{Maximum of }(S_C,S_D) \qquad [Eq. 6]$$

If Host System's Orientation=90° Clockwise or 270° Counter-clockwise $$M_R=\text{Maximum of }(S_A,S_B)$$

$$M_L=\text{Maximum of }(S_C,S_D)$$

$$M_{UP}=\text{Maximum of }(S_B,S_C)$$

$$M_{LO}=\text{Maximum of }(S_A,S_D) \qquad [Eq. 7]$$

If Host System's Orientation=180° Clockwise or Counter-clockwise $$M_R=\text{Maximum of }(S_B,S_C)$$

$$M_L=\text{Maximum of }(S_A,S_D)$$

$$M_{UP}=\text{Maximum of }(S_C,S_D)$$

$$M_{LO}=\text{Maximum of }(S_A,S_B) \qquad [Eq. 8]$$

If Host System's Orientation=270° Clockwise or 90° Counter-clockwise $$M_R=\text{Maximum of }(S_C,S_D)$$

$$M_L=\text{Maximum of }(S_A,S_B)$$

$$M_{UP}=\text{Maximum of }(S_A,S_D)$$

$$M_{LO}=\text{Maximum of }(S_B,S_C) \qquad [Eq. 9]$$

The unadjusted X, Y, and Z coordinate values can be calculated by the following equations:

$$X_{unadj}=(M_R-M_L)/(M_R+M_L) \qquad [Eq. 10]$$

$$Y_{unadj}=(M_{UP}+M_{LO})/(M_{UP}+M_{LO}) \qquad [Eq. 11]$$

$$Z_{unadj}=M_{ALL}*BZ/M_{BUF-MAX} \qquad [Eq. 12]$$

To calculate the Z coordinate value, a first-in-first-out (FIFO) memory buffer is used. This buffer should store the historical values of $M_{ALL}$ from previous measurements. The depth of this buffer should be adjustable by the electronic controller. $M_{BUF-MAX}$ represents the highest $M_{ALL}$ value that was measured from a set of previous cycles. For optimum performance the buffer depth is set to be 32, which means $M_{BUF-MAX}$ is the highest value measured in the previous 32 cycles. $Z_{unadj}$ is zero when the object is outside the detection range. It becomes larger when the object moves closer to the sensors. The highest value of $Z_{unadj}$ is BZ.

Aside from the distance between the object and the receivers, the intensities of the received signals are also affected by the surface area and reflectivity of the object that can reflect the IR radiation. Because of that, the method can only use the received signals to calculate the distance in relative terms. By dividing the current $M_{ALL}$ value by $M_{BUF-MAX}$, we can ensure the resultant value is always less than or equal to unity. Next scale the result to the desired Z boundary by multiplying it with system factor BZ.

Figure 8A:
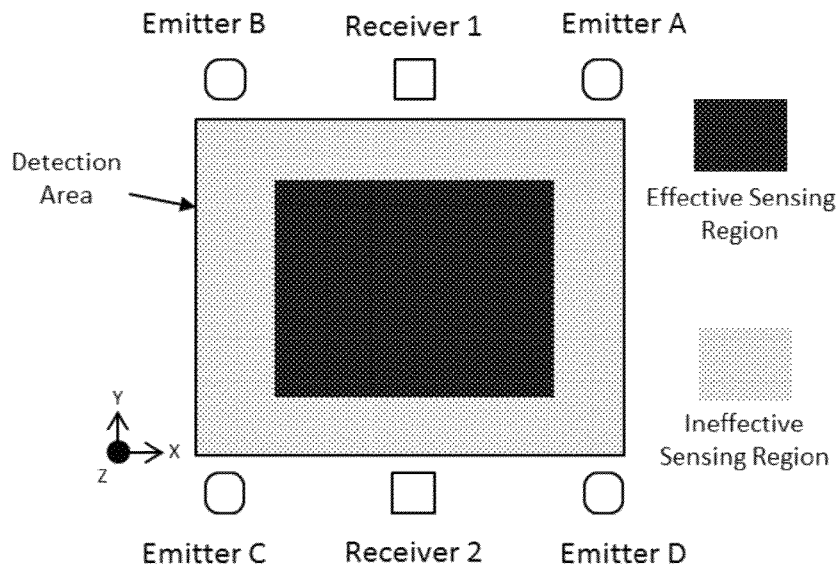
FIG. 8A shows an effective sensing region and an ineffective sensing region.

The digitized signals ($S_A$, $S_B$, $S_C$, $S_D$) represent the intensity of the received signals ($R_A$, $R_B$, $R_C$, $R_D$). The X and Y coordinate values obtained from the above equations become problematic when one or more received signals are very weak. It happens when the object (such as the user's hand) is placed near the edges of the detection area. The IR radiation from the opposite side is so weak that no noticeable reflection can be captured by the receivers. In the X and Y equations, one term will become very small or zero. For example, if a user places his/her hand near the right edge of the detection area, ML will be very small Small movement along the X direction will not produce any noticeable change in the X coordinate value. Effectively there are two regions of detection areas, Effective Sensing Region and Ineffective Sensing Region, as illustrated in FIG. 8A.

Figure 8B:
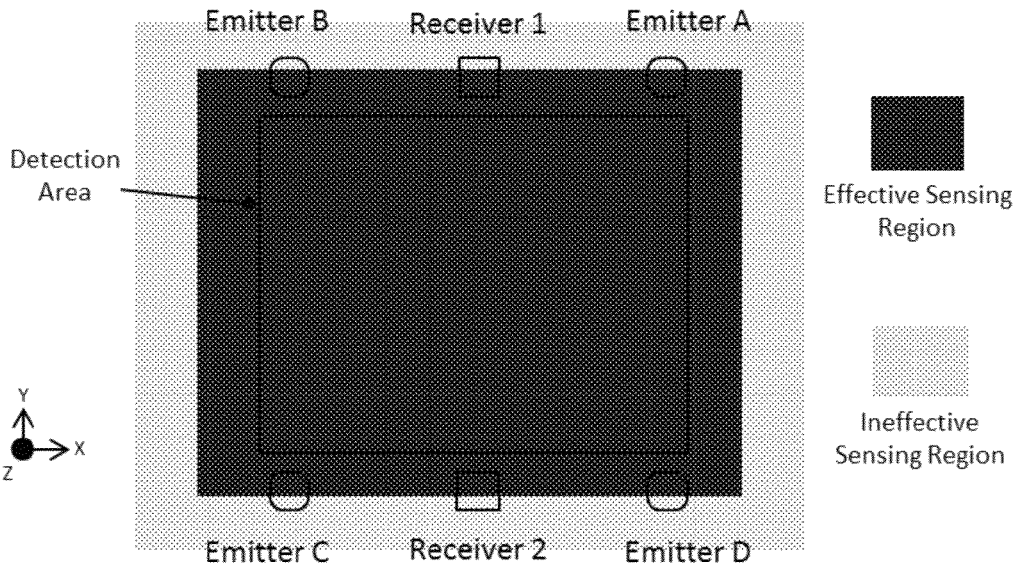
FIG. 8B shows that the effective sensing region is scaled up to be larger than the detection area.

In the method, the way to correct this problem is to map the $X_{unadj}$ and $Y_{unadj}$ values to the virtual boundaries VBX1 and VBY1 (from Eq. 1 & 2). In other words, the electronic controller is configured to scale up the X and Y virtual coordinates by the virtual boundaries so that an effective sensing region larger than the rectangular detection area is defined. The Effective Sensing Region is practically enlarged (i.e. scaled up) to be larger than the (rectangular) detection area, as illustrated in FIG. 8B. This way when the object (hand) is moving near the edges, a small movement will produce a large change in coordinates on the display device that coincides with the object's movement. The mathematical relations are:

$$X_{RAW}=(X_{unadj})(VBX1)=(M_R-M_L)(VBX1)/(M_R+M_L) \qquad [Eq. 13]$$

$$Y_{RAW}=(Y_{unadj})(VBY1)=(M_{UP}+M_{LO})(VBY1)//(M_{UP}+M_{LO}) \qquad [Eq. 14]$$

The exact boundaries of the Effective Sensing Region in FIG. 8A are affected by the emission characteristics of the emitters, such as intensities and view angles. Depending on the components used, the actual boundaries can be different from set-up to set-up. But the effect of this discrepancy is mitigated by the scaling factors FX1 and FY1. Those two values may be chosen to fit any particular set-up. In actual implementation the method may be implemented by a microprocessor or other digital logics. FX1 and FY1 can be changed by software, thus providing the possibility to tune or calibrate the set-up in the field.

In the method, the Z coordinate value does not suffer from the Ineffective Sensing Region mentioned above, and therefore, $$Z_F = Z_{unadj} \quad \text{[Eq. 15]}$$

The $X_{RAW}$ and $Y_{RAW}$ coordinate values form an origin (the zero values) at the center of the detection area. Half of the $X_{RAW}$ and $Y_{RAW}$ values are negative. For ease of computation, they are adjusted by the electronic controller so that their zero values (the adjusted origin) are located at a corner of the Effective Sensing Region. This step is represented by the first step in FIG. 9. Depending on the particular set-up and the host system, one can choose which corner to move the origin to. For the following discussion, the origin is moved to the lower left corner of the Effective Sensing Region. The resultant X and Y coordinate values are called $X_O$ and $Y_O$.

$$X_O = X_{RAW} + (VBX1/2) \quad \text{[Eq. 16]}$$

$$Y_O = Y_{RAW} + (VBY1/2) \quad \text{[Eq. 17]}$$

An issue arises when the object moves in the Z direction but remains stationary (or almost stationary) in the X-Y plane. For example, if the user places his hand above the left half of the display and moves it closer to the sensors and display, the intensities of all four received signals ($R_A$, $R_B$, $R_C$, $R_D$) change, and hence the values of $S_A$, $S_B$, $S_C$, and $S_D$ will change. As the hand moves closer to the display, $M_L$ becomes stronger while $M_R$ becomes weaker, and the resultant X coordinate value will shift toward the left border of the detection area. Drifting in the Y direction will happen similarly. As the Z coordinate value increases, the Y coordinate value will shift toward the border (upper or lower) that the hand is closer to.

Figure 10:
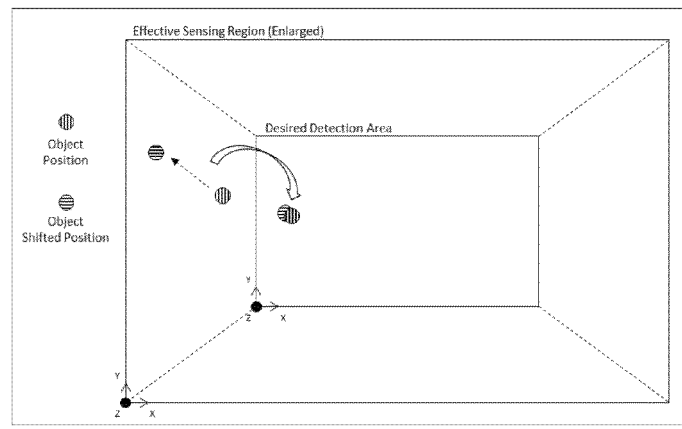
FIG. 10 shows that the drifting phenomenon is mitigated.

This drifting phenomenon can be mitigated by a scheme of scaling up and then down the sensing region. In the method, the detection area is scaled up first. This will effectively enlarge the sensing region, thus allowing the X and Y coordinate values to "drift" more for the same amount of changes in the Z direction. Next, the sensing area will be scaled down to fit the desired detection area, such as the display device. By scaling down the sensing area we also scaled down the amount of drifting allowed. Thus the X and Y coordinates would stay very stable even when Z changes, as illustrated in FIG. 10.

Figure 11:
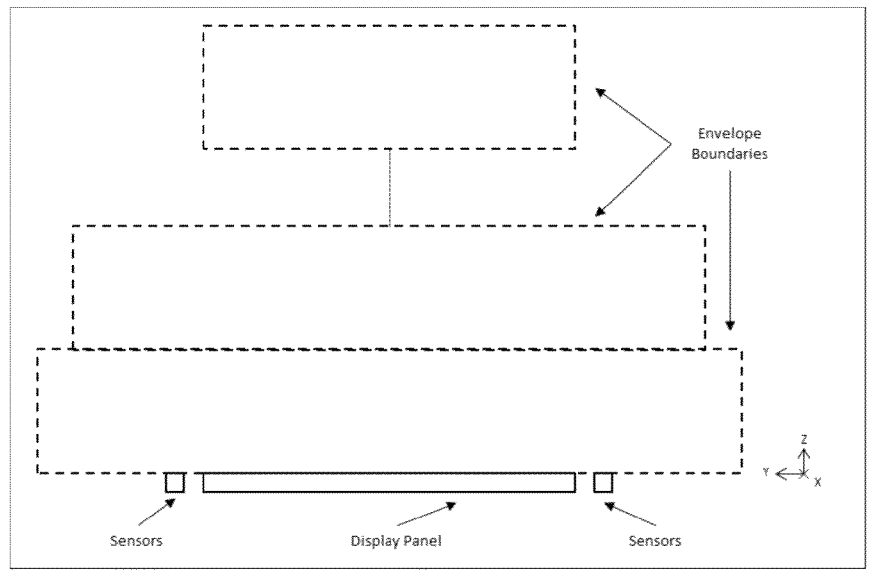
FIG. 11 shows envelope boundaries.

This two-step technique can be thought as allowing the X and Y coordinates to drift away first and then pulling them back. The exact scaling ratio may be chosen to match the amount of drifting observed. Effectively this technique defines the envelope boundary that the X and Y coordinate values are allowed to drift. Since the amount of drifting is dependent on the Z value, (i.e. more drifting when Z is larger), this envelope boundary should be obtained from different scaling factors at different Z ranges. The entire envelope boundary will take the shape of a pyramid, as illustrated in FIG. 11.

Figure 12:
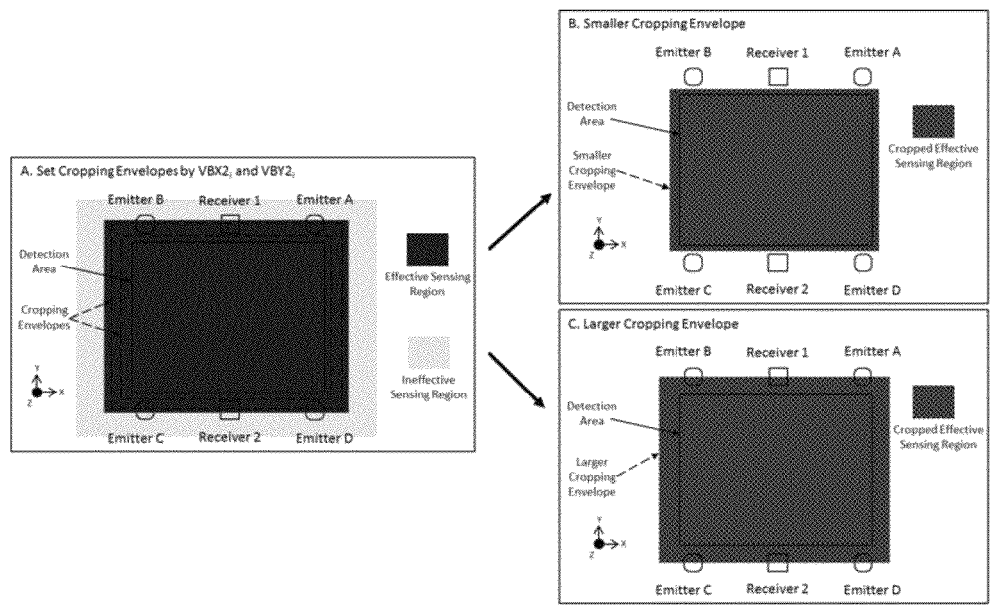
FIG. 12 shows the process of cropping the effective sensing region.

In the method, since the sensing region is already enlarged, the sensing area is not needed to be scaled up. What is actually done instead is cropping away the ineffective sensing region of FIG. 8B. FIG. 12 illustrates the process of cropping the effective sensing region. The same results will be achieved as scaling up as long as the Cropped Effective Sensing Region is equal to a region defined by the envelope boundaries. This cropping process is represented by the second stage in FIG. 9. Virtual boundaries VBX2 and VBY2 from Eqs. 3 and 4 are used as the envelope boundaries. Mathematically the relations are:

$$X_C = X_O - (VBX1 - VBX2)/2 \quad \text{[Eq. 18]}$$

$$Y_C = Y_O - (VBY1 - VBY2)/2 \quad \text{[Eq. 19]}$$

where $X_C$ and $Y_C$ are the enlarged coordinate values.

Figure 9:
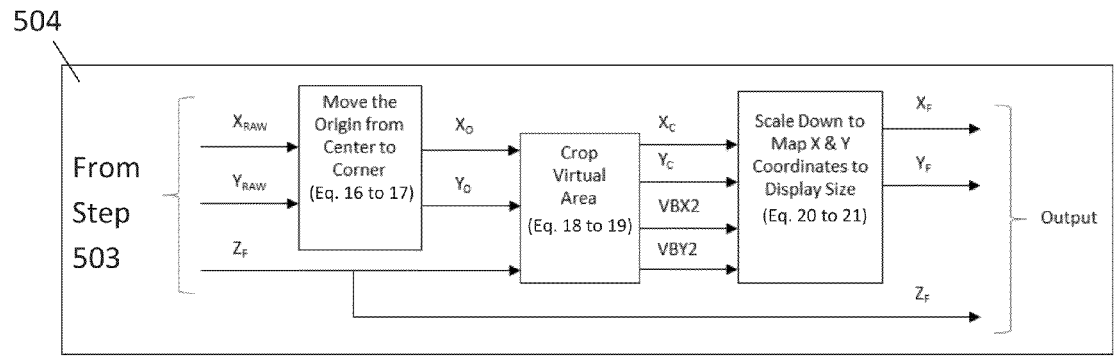
FIG. 9 shows detailed operations in the stage of enhancing data and calculating real coordinates.

At the last stage in FIG. 9, the coordinate values in the Cropped Effective Sensing Region are scaled down to match the resolution of the display device, BX and BY. Mathematically the relations are:

$$X_F = X_C(BX/VBX2) \quad \text{[Eq. 20]}$$

$$Y_F = Y_C(BY/VBY2) \quad \text{[Eq. 21]}$$

The ratios BX/VBX2 and BY/VBY2 are the scaling factors that should coincide with the envelope boundaries illustrated in FIG. 11. Since VBX2 and VBY2 are derived from scaling factors FX2 and FY2, the drifting phenomenon can be adjusted for different Z values by software in the electronic controller.

At this point, the X, Y, and Z coordinate values will accurately represent the object's position in the 3D space. The host system may set the X and Y coordinate values to equal to its mouse cursor. Threshold values may be set in the Z direction to decide whether the user is making a selection or not.

Figure 13:
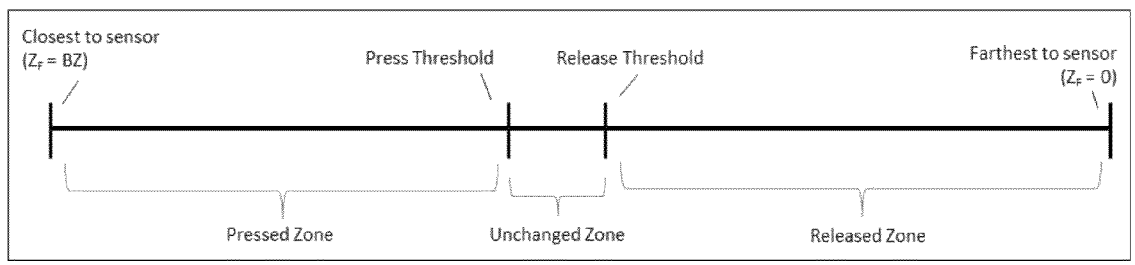
FIG. 13 shows button thresholds dividing the Z range into three zones.

When the method is used to control the mouse cursor on the host system, the Z coordinate value may be used to resemble the button-clicking action of a computer mouse. In the Z range we define two threshold values, Press Threshold and Release Threshold, as illustrated in FIG. 13. These two thresholds divide the Z range into three zones: Released Zone, Unchanged Zone, and Pressed Zone. Depending on which zone the Z coordinate value is at, the method can decide whether the "mouse button" is pressed or released. In other words, the electronic controller is configured to resemble the button-clicking action of a computer mouse based on the Z coordinate value of the object and two thresholds defined in the range of the Z coordinate value.

When the hand is in the Released Zone, the mouse button is released. When the hand moves from the Released Zone, crosses the Press Threshold, into the Pressed Zone, the mouse button is pressed. If the hand stays in the Pressed Zone, the mouse button is continuously pressed. To release the button, the hand should move from the Pressed Zone, crosses the Release Threshold, into the Release Zone.

If the hand is located in between the Press Threshold and the Release Threshold, it is in the Unchanged Zone. The mouse button is at the same status as it was previously before entering the Unchanged Zone. For example, if the hand was previously in the Release Zone, the mouse button stays released when the hand enters the Unchanged Zone. If the hand was previously in the Pressed Zone, the mouse button stays pressed when the hand enters the Unchanged Zone. The Z coordinate value takes on the range from 0 to BZ. BZ may take on any value. Depending on the system design, BZ may be a high number, thus giving a high resolution to the Z value. If only one threshold is used to determine whether the mouse button is pressed or released, a lot of false actions would occur if the user's hand stays around the threshold, which will cause a lot of frustrations to the user. By using two thresholds the method mitigates the problem. The Press Threshold and the Release Threshold can both be changed by software, thus allowing the user to choose values that yield the most comfortable operation. A pseudo code written to implement the above-mentioned method is provided below. Pseudo code:

```
//Grab the reflecting intensities result from 4 IR emitters
//variables descriptions
//VBX1, VBY1, BZ are the moving area of the cursor
//move original position
//the variable definitions:
//VBX1, VBY1 (Moving area parameters)
//BX, BY(Panel area parameters)
//FX1, FY1 (moving area multiplier parameter)
//FX2, FY2 (close area multiplier parameter)
//FX3, FY3 (far area multiplier parameter)
//x_pos, y_pos, z_pos (extraction of the xyz result every time)
//pressed_flag (determine the current button is pressed or released)
//pressed_threshold (threshold value for triggering press button command)
//released_threshold (threshold value for triggering release button command)
//z_far (z value output for the distance between hand and sensor is the farest position)
//z_close (z value output for the distance between hand and sensor is the closest position)
//z_pos (extraction nf the xyz result every time)
//init LEDs configurations
init LEDs output power parameters
//init moving area parameters
FX1=FY1=2;
FX2=FY2=1.5;
FX3=FY3=1.25;
BX=800;
BY=480;
VBX1=BX * FX1;
VBY1=BY * FY1;
VBX2=BX * FX2;
VBY2=BY * FY2;
VBX3=BX * FX3;
VBY3=BY * FY3;
//main loop
//calibrating the compensator LED output power
//capture the reflecting intensity
LED 1 turns on, others off
Read LED 1 reflection intensity
LED 2 turns on, others off
Read LED 2 reflection intensity
LED 3 turns on, others off
Read LED 3 reflection intensity
LED 4 turns on, others off
Read LED 4 reflection intensity
Convert the intensity analog result to digital result
//Check system orientation
Orientation = (0°, 90°, 180°, 270°)
//calculating x coordinate
Compare LED 1 and 4 to find the right highest reflection intensity value (LED_RIGHT_MAX M_R)
Compare LED 2 and 3 to find the left highest reflection intensity value (LED_LEFT_MAX M_L)
X coordinate = [(M_R - M_L)/ (M_R + M_L)] * VBX1
//calculating y coordinate
Compare LED 1 and 2 to find the upper highest reflection intensity value (LED_UPPER_MAX M_U)
Compare LED 3 and 4 to find the lower highest reflection intensity value (LED_LOWER_MAX M_D)
Y coordinate = [(M_U - M_D)/ (M_U + M_D)] * VBY1
//calculating z coordinate
Get the highest intensity value from 4 LEDs (LED_ENTIRE_MAX M_ALL)
Get that LED amplitude value (LED_ENTIRE_MAX_AMP M_BUF-MAX)
Z coordinate = [M_ALL / M_BUF-MAX] * BZ
//Coordinate calculation:
//moving origin position
If (z_pos value shows the hand is close to sensor)
{
  //crop the larger area
  x_pos = x_pos - [ (VBX1 -BX* FX2) / 2];
  y_pos = y_pos - [ (VBY1- BY* FY2) / 2];
  //map to actual area
  x_pos = x_pos / FX2;
  y_pos = y_pos / FY2;
}
else
{
  //crop the smaller area
  x_pos = x_pos - [ (VBX1 - BX * FX3) / 2];
  y_pos = y_pos - [ (VBY1 - BY * FY3) / 2];
  //map to actual area
  x_pos = x_pos / FX3;
  y_pos = y_pos / FY3;
}
//reset the x_pos and y_pos if out of panel area range
if (x_pos<0)
  x_pos=0;
if (x_pos>BX)
  x_pos=BX;
if (y_pos<0)
  y_pos=0;
if (y_pos>BY)
  y_pos=BY;
//Two distinct threshold values:
//assume the x y z pos are obtained from a function already
if (pressed_flag shown button is pressed)
{
  if (z_pos is in between z_far and released_threshold)
  {
    //release mouse left button
    Set presses_flag as button released
  }
  else keep the left button pressing
}
else
{
  if (z_pos is in between z_close and pressed_threshold)
  {
    //press mouse left button
    Set presses_flag as button pressed
  }
  else keep the left button releasing
}
Output 3D Cartesian coordinate values and left mouse button clicked or released
//return to the main loop
```

According to another embodiment of the present patent application, a method for detecting an object in three-dimensional space includes: defining a rectangular detection area with four emitters, the emitters being disposed around the four vertices of the rectangular detection area respectively; disposing two receivers at the midpoints of two edges of the rectangular detection area respectively; controlling the emitters to radiate light in predetermined wavelengths; controlling the receivers to capture light in the predetermined wavelengths reflected by the object and thereby output a plurality of signals; converting the signals into coordinates of the object; and communicating with and transmitting the coordinates of the object to a host system, the host system including a display device.

According to yet another embodiment of the present patent application, a system for detecting an object in three-dimensional space includes: four emitters defining a rectangular detection area, the emitters being disposed around the four vertices of the rectangular detection area respectively; two receivers being disposed at the midpoints of two edges of the rectangular detection area respectively; and an electronic controller being connected with the emitters and the receivers and configured to control the emitters to radiate light in predetermined wavelengths, to control the receivers to capture light in the predetermined wavelengths reflected by the object and thereby output a plurality of signals, and to convert the signals into coordinates of the object. Each edge of the rectangular detection area that has a receiver disposed thereon is longer than the distance between the centers of emitters disposed at the two ends of the edge, while each edge of the rectangular detection area that has no receiver disposed thereon is shorter than the distance between the centers of emitters disposed at the two ends of the edge. The electronic controller is configured to control one emitter to radiate light at a time.

What is claimed is:

1. A system for detecting an object in three-dimensional space comprising:
    four emitters defining a rectangular detection area, the emitters being disposed around the four vertices of the rectangular detection area respectively;
    two receivers being disposed at the midpoints of two edges of the rectangular detection area respectively;
    an electronic controller being connected with the emitters and the receivers and configured to control the emitters to radiate light in predetermined wavelengths, to control the receivers to capture light in the predetermined wavelengths reflected by the object and thereby output a plurality of signals, and to convert the signals into coordinates of the object; and
    a host system, wherein:
    the electronic controller is configured to communicate with and transmit the coordinates of the object to the host system;
    the emitters are light-emitting-diodes being configured to emit light in near-infrared wavelengths, the receivers are photodiodes, the electronic controller comprises analog-to-digital converters, digital logic circuits, random access memory, and non-volatile memory, and the host system comprises a display device;
    the electronic controller is configured to initialize a set of system factors to be used for subsequent calculations, to convert the signals output by the receivers into digital signals, to perform calculations based on the digital signals to determine virtual coordinates of the object in 3D space, to further process the X and Y virtual coordinate values based on the resultant Z coordinate value so that the X and Y coordinate values correspond to pixel points on the host system's display device, and to output the final X, Y, and Z coordinate values to the host system; and
    the set of system factors comprises orientation information of the host system's display device, factors to be used to set overall boundaries of the rectangular detection area, scaling factors for scaling up X and Y boundaries of the rectangular detection area, and virtual boundaries of the rectangular detection area.

2. The system of claim 1, wherein each edge of the rectangular detection area that has a receiver disposed thereon is longer than the distance between the centers of emitters disposed at the two ends of the edge, while each edge of the rectangular detection area that has no receiver disposed thereon is shorter than the distance between the centers of emitters disposed at the two ends of the edge.

3. The system of claim 1, wherein the electronic controller is configured to control one emitter to radiate light at a time.

4. The system of claim 1, wherein the rectangular detection area is set equivalent to the size of the display device of the host system.

5. The system of claim 1, wherein the signals output by the receivers are analog signals and the electronics controller is configured to filter and amplify the analog signals and then convert the analog signals to digital signals with an analog-to-digital converter.

6. The system of claim 5, wherein to calculate the virtual coordinates, the electronic controller is configured to compare the digital signals and find the maximum values at the four edges of the rectangular detection area.

7. The system of claim 5, wherein the electronic controller is configured to adjust the depth of a first-in-first-out memory buffer so as to calculate the Z coordinate of the object in 3D space.

8. The system of claim 5, wherein the electronic controller is configured to scale up the X and Y virtual coordinates by the virtual boundaries so that an effective sensing region larger than the rectangular detection area is defined.

9. The system of claim 5, wherein to further process the X and Y virtual coordinate values, the electronic controller is configured to move the origin of the X and Y coordinates to a corner of the effective sensing region.

10. The system of claim 5, wherein to further process the X and Y virtual coordinate values, the electronic controller is configured to crop the effective sensing region so that the cropped effective sensing region is equal to a region defined by the virtual boundaries.

11. The system of claim 5, wherein to further process the X and Y virtual coordinate values, the electronic controller is configured to scale down the X and Y virtual coordinate values.

12. The system of claim 1, wherein the electronic controller is configured to resemble the button-clicking action of a computer mouse based on the Z coordinate value of the object and two thresholds defined in the range of the Z coordinate value.

13. A method for detecting an object in three-dimensional space comprising:
    defining a rectangular detection area with four emitters, the emitters being disposed around the four vertices of the rectangular detection area respectively;
    disposing two receivers at the midpoints of two edges of the rectangular detection area respectively;
    controlling the emitters to radiate light in predetermined wavelengths;
    controlling the receivers to capture light in the predetermined wavelengths reflected by the object and thereby output a plurality of signals;
    converting the signals into coordinates of the object; and
    communicating with and transmitting the coordinates of the object to a host system, the host system comprising a display device;
    wherein the step of converting the signals into coordinates of the object comprises:
    initializing a set of system factors to be used for subsequent calculations, the set of system factors comprising orientation information of the display device, factors to be used to set overall boundaries of the rectangular detection area, scaling factors for scaling up X and Y boundaries of the rectangular detection area, and virtual boundaries of the rectangular detection area;
    converting the signals output by the receivers into digital signals;
    performing calculations based on the digital signals to determine virtual coordinates of the object in 3D space;
    further processing the X and Y virtual coordinate values based on the resultant Z coordinate value so that the X and Y coordinate values correspond to pixel points on the display device; and
    outputting the final X, Y, and Z coordinate values to the host system.

14. A system for detecting an object in three-dimensional space comprising:
    four emitters defining a rectangular detection area, the emitters being disposed around the four vertices of the rectangular detection area respectively;
    two receivers being disposed at the midpoints of two edges of the rectangular detection area respectively;

an electronic controller being connected with the emitters and the receivers and configured to control the emitters to radiate light in predetermined wavelengths, to control the receivers to capture light in the predetermined wavelengths reflected by the object and thereby output a plurality of signals, and to convert the signals into coordinates of the object; and a host system, which comprises a display device; wherein:

each edge of the rectangular detection area that has a receiver disposed thereon is longer than the distance between the centers of emitters disposed at the two ends of the edge, while each edge of the rectangular detection area that has no receiver disposed thereon is shorter than the distance between the centers of emitters disposed at the two ends of the edge;

the electronic controller is configured to control one emitter to radiate light at a time;

the electronic controller is configured to initialize a set of system factors to be used for subsequent calculations, to convert the signals output by the receivers into digital signals, to perform calculations based on the digital signals to determine virtual coordinates of the object in 3D space, to further process the X and Y virtual coordinate values based on the resultant Z coordinate value so that the X and Y coordinate values correspond to pixel points on the display device, and to output the final X, Y, and Z coordinate values to the host system; and the set of system factors comprises orientation information of the display device, factors to be used to set overall boundaries of the rectangular detection area, scaling factors for scaling up X and Y boundaries of the rectangular detection area, and virtual boundaries of the rectangular detection area.

15. The system of claim 14, wherein the electronic controller is configured to resemble the button-clicking action of a computer mouse based on the Z coordinate value of the object and two thresholds defined in the range of the Z coordinate value.

\* \* \* \* \*